Patented Jan. 4, 1944

2,338,461

UNITED STATES PATENT OFFICE 2,338,461

LACQUER AND A PROCESS OF APPLYING SAME

Guido Schultze, Mannheim, Germany; vested in the Alien Property Custodian

No Drawing. Application March 30, 1940, Serial No. 326,969. In Germany April 13, 1939

5 Claims. (Cl. 117—161)

The present invention relates to new lacquers and a process of applying same.

Chloro-rubber is not very resistant to boiling liquids and possesses but a limited resistance to heat. It does not stand heating at about 150° C. and above without deterioration.

I have now found that very resistant coatings are obtained by coating the substrata with mixtures comprising (1) chloro-rubber, (2) hard resins, (3) alkyd resins or drying oils or blown drying oils, and (4) vulcanization accelerators and baking the coatings obtained. Among hard resins I may mention, besides natural hard resins, such as copal resins, especially hard artificial resins, as for example resinous condensation products, such as the phenol-formaldehyde resins or urea-formaldehyde resins, and resinous polymerization products, for example such as are obtained by polymerizing styrene in the presence of phenol. Alkyd resins suitable for the present purpose are the condensation products prepared from polyvalent alcohols and polybasic acids with the co-employment of monobasic (drying or non-drying) fatty acids or their esters. As vulcanization accelerators I may use any substance known as a vulcanization accelerator for rubber, as for example mercaptobenzothiazol, tetramethylthiurambisulphide and the piperidine salt of pentamethylenedithiocarbamic acid.

Chloro-rubber is preferably employed in a stabilized form. The stabilization may be effected according to any known method, for example in the manner described in the British Patent 418,-230. Plasticizers may be, but do not necessarily have to be added.

Advantageously the lacquers which are made up with the usual additions, such as solvents, and, if desired, pigments and the like, are allowed to ripen for some time, say several days, before being brushed or sprayed on. Lacquers are thus obtained which possess especially pale color. After the solvent has evaporated the coatings are baked by heating them at fairly high temperatures, for example above 100°, usually between 120° and 200° C. and preferably between about 160° and about 180° C. for one or several hours. The coatings obtained are very hard and possess a high resilience and resistance to chemicals as well as to weathering.

The following examples serve to illustrate how the present invention may be carried out in practice, but the invention is not restricted to these examples. The parts are by weight.

Example 1

12 parts of chloro-rubber stabilized by means of about 2 per cent of phenoxypropene oxide, 12 parts of a resin obtained by condensing in known manner castor oil, phthalic acid and glycerine, 12 parts of a resin obtained by polymerizing styrene in the presence of phenol and 0.12 part of tetramethylthiurambisulphide are dissolved in 64 parts of xylene. The lacquer thus obtained is brushed on metallic substrata, for example sheet aluminium. After 30 minutes' drying in the air the coating is baked at 180° C. for an hour. The resulting coating is but scarcely yellowish, has an extraordinary firm adherence to the substratum and does not crack off when the latter is sharply bent or flexed. It is perfectly resistant to mineral oils and fuel mixtures and remains unattached under the influence of soft soaps, tooth pastes and floor polishes; it also resists hot caustic soda solution.

Example 2

10 parts of chloro-rubber stabilized by means of about 2 per cent of phenoxypropene oxide, 12 parts of a resin obtained by the condensation of linseed oil, phthalic acid and glycerine, 8 parts of a resin obtained by alkaline condensation of tertiary butylphenol with formaldehyde and 0.12 part of mercaptobenzothiazol are dissolved in 64 parts of toluene. The solution is brushed on black sheet. After 30 minutes' drying in the air, the coating is baked for an hour at 160° C. A second coating of the same kind is applied to the sheet which is again dried in the air for ½ hour and baked for an hour at 160° C.

The brownish firmly adhering coating thus prepared is extremely hard and resistant to solvents, as benzene and benzine hydrocarbons, oil of turpentine and dilute hydrochloric acid.

Example 3

8 parts of chloro-rubber stabilized by means of about 2 per cent of phenoxypropene oxide, 16 parts of a resin obtained by polymerizing styrene in the presence of phenol, 12 parts of a mixture of 80 per cent of low viscosity linseed stand oil and 20 per cent of wood oil stand oil, and 0.12 part of tetramethylthiurambisulphide are dissolved in 64 parts of a mixture of toluene and xylene. After mixing in 18 parts of iron oxide red, the resulting lacquer is brushed on metal substrata, for example aluminium or light metal alloys or tinned sheet iron, and baked for 2 hours at from 140 to 150° C. after the solvent has been evaporated.

The coatings obtained have a good resilience and adhesive power and are resistant to weathering and to fuels. By adding plasticizers, such as chlordiphenyl, chlornaphthalene, benzylnaphthalene or acrylic acid polymerization products, lacquers of still greater resilience are obtained.

What I claim is:

1. Lacquers comprising a solution containing about 8 to about 12% of (1) chloro-rubber, about 8 to 16% of (2) a hard resin selected from the class consisting of natural hard resins, phenol-formaldehyde resins, urea-formaldehyde resins and hard resinous polymerization products, about 12% of (3) a substance selected from the class consisting of oil modified alkyd resins, drying oils and blown drying oils and less than 1% of (4) a rubber vulcanization accelerator, said lacquers producing a coating resistant to a baking temperature equal to 200° C.

2. The process for producing coatings which comprises coating a substratum with a solution comprising about 8 to about 12% of (1) chloro-rubber, about 8 to 16% of (2) a hard resin selected from the class consisting of natural hard resins, phenol-formaldehyde resins, urea-formaldehyde resins and hard resinous polymerization products, about 12% of (3) a substance selected from the class consisting of oil modified alkyd resins, drying oils and blown drying oils and less than 1% of (4) a rubber vulcanization accelerator and heating the coating obtained to a temperature between 160° and 200° C.

3. A lacquer comprising a solution containing about 12% of chloro-rubber, about 12% of a resin obtained by condensing castor oil, phthalic acid and glycerin, about 12% of a resin obtained by polymerizing styrene in the presence of phenol and about 0.12% of tetramethylthiuram bisulsulphide.

4. A lacquer comprising a solution containing about 10% of chloro-rubber, about 12% of a resin obtained by condensing linseed oil, phthalic acid and glycerin, about 8% of a resin obtained by alkaline condensation of tertiary butylphenol with formaldehyde and about 0.12% of mercaptobenzothiazole.

5. A lacquer comprising a solution containing about 8% of chloro-rubber, about 16% of a resin obtained by polymerizing styrene in the presence of phenol, about 12% of a mixture of 80% of low viscosity linseed stand oil and 20% of wood oil stand oil, and about 0.12% of tetramethylthiurambisulphide.

GUIDO SCHULTZE.